United States Patent [19]

Kawecki

[11] Patent Number: 4,827,609
[45] Date of Patent: May 9, 1989

[54] METHOD AND APPARATUS FOR MOUNTING COMPONENTS ON A PRINTED CIRCUIT BOARD OR SIMILAR MOUNTING SURFACE

[75] Inventor: Mark E. Kawecki, Broomall, Pa.

[73] Assignee: Mars Incorporated, McLean, Va.

[21] Appl. No.: 62,585

[22] Filed: Jun. 16, 1987

[51] Int. Cl.⁴ ............................................. H05K 3/30
[52] U.S. Cl. ...................................... 29/832; 29/462; 411/549; 411/550; 411/553
[58] Field of Search ................................ 29/832, 462; 411/549–551, 553

[56] References Cited

U.S. PATENT DOCUMENTS

| | | | |
|---|---|---|---|
| 439,771 | 11/1890 | Brown | 411/549 X |
| 2,311,592 | 2/1943 | Hapanowicz | 411/549 X |
| 2,399,750 | 5/1946 | Marty | 411/550 |
| 3,179,367 | 4/1965 | Rapata | 411/553 X |
| 4,467,987 | 8/1984 | Small | 411/549 X |

Primary Examiner—Timothy V. Eley
Assistant Examiner—Taylor J. Ross
Attorney, Agent, or Firm—Davis Hoxie Faithfull & Hapgood

[57] ABSTRACT

A single piece fastener and a method of using this fastener to secure connectors to a printed circuit board comprised of a longitudinal member with a top section which rests on top of the connector and a bottom section with an inclined surface is described. The fastener is inserted through the connector and through the circuit board. When turned, the inclined surface interacts with the bottom of the circuit board, wedging the connector to the circuit board.

20 Claims, 1 Drawing Sheet

METHOD AND APPARATUS FOR MOUNTING COMPONENTS ON A PRINTED CIRCUIT BOARD OR SIMILAR MOUNTING SURFACE

BACKGROUND OF THE INVENTION

1. Field of the Invention

The present invention relates generally to the mechanical mounting of surface mounted components such as connectors to a mounting surface such as a printed circuit board, and more particularly to a fastener arrangement and the method of using this arrangement to mount connectors to printed circuit boards with access to only one side of the printed circuit board thereby facilitating the manufacturing process.

2. Description of the Prior Art

Surface mounted components are typically placed on a printed circuit board and held in place with solder paste until the components are soldered permanently in place with a soldering process such as the reflow process. Until the soldering process is completed, the components held in place with solder paste are subject to moving and falling off the printed circuit board as a result of vibration and shock conditions.

Connectors and connector headers provide the interface between a printed circuit board and other boards or the wires or cables leading to other components. These connectors are typically amongst the largest and heaviest components to be mounted to the board. As was the case for other components, solder paste is typically used initially to hold the connectors in position, and solder helps hold the connectors in place once the soldering process is completed; however, mechanical fastening of these connectors to the printed circuit board is also generally desirable for a number of reasons. For example, these surface mounted connectors typically include contacts which must be spring loaded against the printed circuit board to insure good electrical contact. Mechanical fastening is used to apply the necessary load force. Additional connection strength between connector and board is also required to withstand the forces occurring upon insertion and removal of a mating connector with the board mounted connector, and further necessitates some form of mechanical fastening in addition to the solder connection. In order for a mechanical fastener for connecting a connector to a printed circuit board to be practical, it must be able to withstand the high temperatures associated with the reflow process. These temperatures may typically reach about 450° F. Further, fastening must be performed with very little impact force so that other components mounted with solder paste will not fall off or move. In addition to minimizing manufacturing costs, it is desirable to accomplish the fastening from one side of the board only, the side on which the connector is mounted.

A variety of mechanical fasteners have been used in an attempt to meet the requirements of critical applications such as the one described above. It is commonplace in the prior art to provide connectors and connector headers with plastic posts that are inserted through the printed circuit board and heat staked. There are a number of disadvantages to this fastening technique. One is the requirement for heat stake tooling. Another is the necessity of having access to both sides of the printed circuit board. In addition, a carefully controlled force on the top of the connector must be provided to apply the proper force on the springs of the connector. While heating the plastic posts for purposes of heat staking, it is difficult to carefully control the force on the connector, making it difficult to achieve good contact of the connector to the board. Finally, the above described process is expensive and the connector must be destroyed if the connector needs to be removed, serviced or repaired.

Also commonplace in the prior art is the use of rivets to fasten components to their mounting surface. Various forms of rivets have been used, all of which have significant disadvantages. Rivets generally require access to both sides of the printed circuit board. Specialty rivets such as flair rivets or pop-rivets have the further disadvantage of requiring a high shock force during their application. This shock force can of course have a deleterious effect on the mounting of other components. All the available rivet solutions have the further disadvantage of requiring special tools, allowing poor control of the mounting force, and maintaining poor control of tolerances.

Additional prior art technologies include "snap" action fasteners. These fasteners are typically plastic. They are compressed a they fit through the mounting hole in the mounting surface and spring out at the bottom when the hole is cleared. The critical disadvantage of this technique is the inability of the materials that are presently used from withstanding the required temperatures of such processes as reflow soldering. With snap action fasteners, it is again difficult to control tolerances and to maintain a constant mounting force.

More recent attempts to overcome the problems outlined above still fall short of their goal. A two piece fastener composed of a post with a screw head and a protruded surface is used to spread a mating plastic cylinder mounted through the mounting surface. The screw head is turned using a conventional screwdriver, and, in a quarter turn of the screw head, the protruded surface on the end of the post opposite the screwhead acts to cam apart the portion of the cylindrical shaft below the mounting surface. This technique requires two pieces, has difficulty in withstanding the required temperature range and is relatively expensive.

SUMMARY OF THE INVENTION

The present invention seeks to overcome the shortcomings and disadvantages of the prior art, in a manner which is simple and inexpensive from a manufacturing point of view.

It is therefore an object of this invention to provide a low cost, easy to assemble fastener, mountable without access to both sides of a mounting surface such as a printed circuit board.

It is a further object of the present invention to provide a fastener that does not require special tooling for assembly.

It is yet another object of the present invention to provide a fastener which will allow good control of mounting force.

Another object of this invention is to provide a fastener that will be self-adjusting to accommodate a wide margin of component and mounting surface tolerances.

A further object of the present invention is to provide a fastener readily able to accommodate the high temperatures associated with the reflow solder process.

Other objects and advantages of the present invention will become apparent from the detailed description of the invention, taken in conjunction with the drawings and the claims.

To accomplish the above and other objects, a single piece fastener is used to mechanically secure a component such as a connector to a mounting surface such as a printed circuit board. The fastener is comprised of a longitudinal member having a length greater than the thickness of the printed circuit board plus the thickness of the connector. The fastener has a top portion with a diameter greater than that of the longitudinal member, for resting on top of the connector. The top portion includes a means for rotating the member. The fastener has a bottom portion substantially perpendicular to the longitudinal member and extending partially around the member. The bottom portion has an inclined upper surface.

In use, the fastener is inserted through a hole in the connector and the printed circuit board. When rotated, the bottom portion of the fastener interacts with the bottom surface of the printed circuit board, wedging the connector to the circuit board.

While the above and subsequent discussion relate primarily to discussion of the application of the present invention to the mounting of a connector on a printed circuit board using surface mount manufacturing technology, it should be recognized that the present invention applies to mounting other components such as beepers, certain transducers, and other bulky components for which additional mechanical fastening beyond merely a solder connection is desirable. Further, while the mounting surface of a printed circuit board is primarily discussed, other mounting surfaces appropriate for surface mounting of components may be used without departing from the invention.

DETAILED DESCRIPTION

Figure 1:
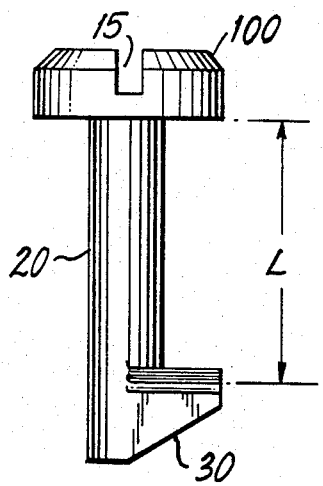
FIG. 1 is a side view of a first embodiment of a fastener according to the present invention.
Figure 2:
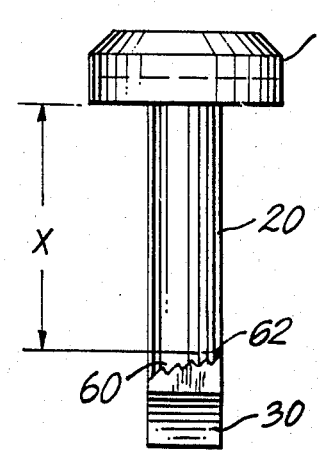
FIG. 2 is second view of the fastener shown in FIG. 1 in which the fastener has been rotated 90 from the position shown in FIG. 1.

FIG. 1 is a side view of one embodiment of a fastener 100 according to the present invention. Fastener 100 is preferably a single piece having a top portion 10, a longitudinal member 20 and a bottom portion 30. The longitudinal member 20 connects the top and bottom portions 10 and 30. Bottom portion 30 includes inclined surface 60 (also shown in FIG. 2) which extends perpendicular to and partially around the longitudinal member 20 as illustrated in FIG. 2. As shown in FIG. 1, longitudinal member 20 has a length L from its top to its bottom. FIG. 1 also shows a distance X extending from the top of longitudinal member 20 to the uppermost point 62 of inclined surface 60 of bottom portion 30. The length L of longitudinal member 20 is greater than the height H (shown in FIG. 3) of opening 2 through a component, such as connector 40 (shown in FIG. 3) plus the thickness T of a mounting surface such as printed circuit board 55 (shown in FIG. 3). The distance X must be less than the height H plus the thickness T by at least the amount of the total allowable accumulated tolerances of the connector height H and board thickness T. While the presently preferred arrangement of FIG. 3 does not include washers or various other separating members either on top of connector 40 or on the top or bottom surfaces 50 and 51 respectively of printed circuit board 55, the thicknesses of any such connectors would just be added to height H or thickness T, as appropriate, when calculating the dimensions of fastener 100.

Top portion 10 also includes a means to rotate the fastener 100, such as groove 15 shown in FIG. 1 which is suitable for use with a screwdriver. It should be recognized that the top portion 10 of fastener 100 could be made to accommodate a phillips head, hex head, allen head or some other configuration of tool suitable for rotating fastener 100, or could comprise a means for rotation not requiring any tools such as a wingnut configuration which could be turned by hand.

Figure 4:
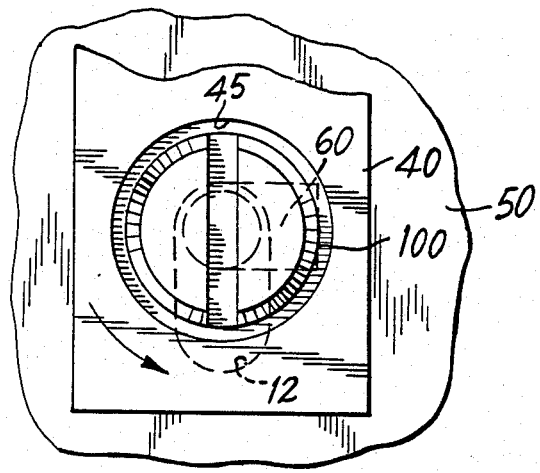
FIG. 4 is a top view of the assembly of FIG. 3.
Figure 6:
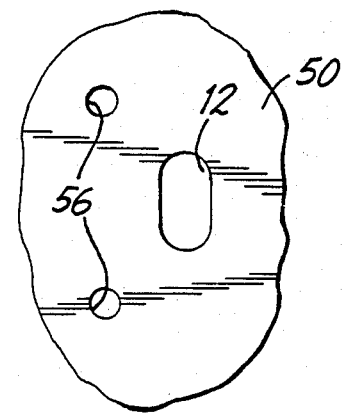
FIG. 6 is a top view of the mounting surface of FIG. 3.

The profile of longitudinal member 20 and inclined surface 60 is such that when properly oriented they fit through an elongated opening in the mounting surface such as opening 2 through printed circuit board 55 shown in FIG. 6 and also in dashed lines in FIG. 4.

Figure 3:
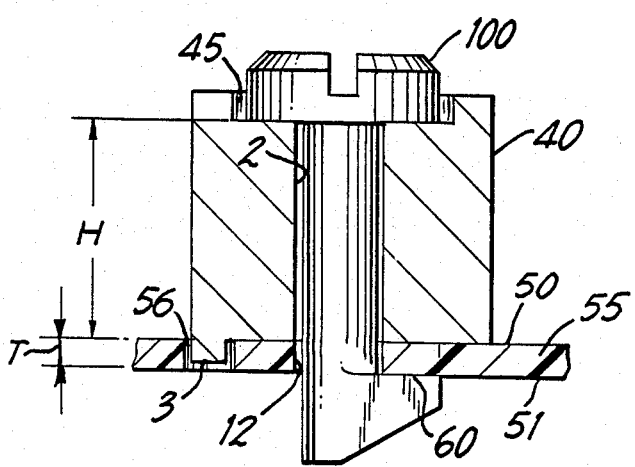
FIG. 3 is a cross-sectional view illustrating the assembly of the fastener of FIG. 1, a component to be mounted and a mounting surface so that the fastener mechanically connects the component to the mounting surface.

As shown in FIG. 3, the fastener 100 has been inserted through opening 2 of connector 40. With the bottom portion 30 aligned with the opening 12, the bottom portion 30 has also been inserted through the printed circuit board 55 and subsequently rotated approximately one quarter turn so that the inclined surface 60 of fastener 100 interferes with bottom surface 51 of printed circuit board 55 thereby mechanically fastening connector 40 to the printed circuit board 55. FIG. 3 illustrates the position of fastener 100 once fastening is completed.

As can be seen in FIG. 3, top portion 10 has a cross-sectional area greater than that of longitudinal member 20 and of opening 2 in connector 40 so it can rest on the top of connector 40 and prevent the fastener 100 from being pulled through connector 40 and printed circuit board 55.

By carefully controlling the torque applied during the rotation of fastener 100, the connection force can be adjusted to a relatively constant level despite variations in the tolerances of the various components. Additionally, to avoid rotation of connector 40 during the rotation of fastener 100, connector 40 preferably has at least two keys 3 which are inserted in corresponding holes 56 in the printed circuit board 55, to secure connector 40 while fastening is taking place. For illustrative purposes, only one key 3 and hole 56 are shown in FIG. 3. A second hole 56 is illustrated in FIG. 6.

Figure 5:
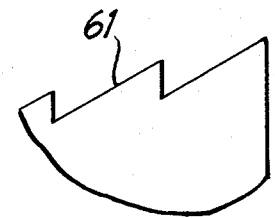
FIG. 5 is an enlarged view of the cammed surface of the fastener of FIG. 1 shown in isolation.

The operation of fastener 100 will be further described below. Referring to FIGS. 4 and 6, fastener 100 is aligned with the opening 12 in printed circuit board 55. Next, fastener 100 is inserted through opening 2 in connector 40 and through the printed circuit board 55. Viewing from the top, fastener 100 is then rotated clockwise to a fastened position causing inclined surface 60 to wedge the base of connector 40 and mounting surface 50 of printed circuit board 55 together. The fastened position of fastener 100 is illustrated in FIG. 3. As illustrated in FIG. 5, inclined surface 60 of bottom portion 30 of fastener 100, preferably has a serrated edge 61 to prevent fastener 100 from slipping in the counter clockwise direction. It should be noted that the more fastener 100 is rotated, the greater the force between connector 40 and mounting surface 50. Thus, by using a torque screwdriver (not shown) to tighten fastener 100, the force can be tightly controlled. For example, if printed circuit board 55 is slightly thinner than the norm, the same amount of force applied with a torque screwdriver will cause the fastener 100 to rotate slightly further, but substantially the same mechanical connection force will be achieved.

FIG. 3 also shows top portion 10 of fastener 100 being seated in a recess in connector 40. This allows the option of using a hole 2 in connector 40 that is round and consequently easier to manufacture instead of an elongated hole which is oblong or oval. Component counterbore 45 will prevent fastener 100 from shifting in hole 2.

I claim:

1. A fastener for the surface mounting of components on a mounting surface having a known thickness, T, by inserting said fastener through an opening of height, H, in said component and a mounting hold through said mounting surface and securing said component to said mounting surface with a mounting force which varies continuously with rotation of said fastener, said degree of rotation being dependent upon the mounting force desired, said fastener comprising:
    a top portion having a cross-sectional area greater than the cross-sectional area of the opening in said component so that said top portion cannot be pulled through said opening and a means for rotating said fastener;
    a longitudinal member having a length from top to bottom greater than the height of the opening through said component plus the thickness of the mounting surface; and
    a bottom portion;
    the longitudinal member connecting the top and bottom portions, said bottom portion having a major axis substantially perpendicular to the longitudinal member, and having a portion with an inclined upper surface extending partially around the longitudinal member, a distance, X, from the uppermost part of the inclined upper surface to the point of engagement of the top portion with the component when the component is secured by said fastener to said mounting surface being less than the height of the opening through said component plus the thickness of the mounting surface such that when said component is secured to said mounting surface, said inclined surface interferes with the bottom of said mounting surface, engaging said component between said top portion and said mounting surface.

2. A fastener as in claim 1, wherein a top portion of said inclined surface is serrated.

3. A fastener as in claim 1, wherein said means for rotating the fastener comprises at least one groove cut in an upper surface of the top portion of the fastener such that said fastener can be rotated with a screwdriver.

4. A fastener as in claim 1, wherein said means for rotating the fastener comprises a wingnut head configuration.

5. A fastener as in claim 1, wherein said means for rotating the fastener comprises a socket head configuration.

6. A fastener as in claim 1, wherein said bottom portion extends along less than one-quarter of the circumference of said member so that said fastener can be inserted through an oval shaped hole in said connector and said printed circuit board.

7. A method of mechanically fastening a component to be mounted on a mounting surface using the surface mounting manufacturing process wherein access to only a single side of the mounting surface is necessary, comprising the steps of:
    mounting a component having an opening therethrough with said opening in alignment with an elongated opening in the mounting surface;
    aligning a fastener comprising:
    a top portion having a cross-sectional area greater than the cross-sectional area of the opening in said component so that said top portion cannot be pulled through said opening and a means for rotating said fastener;
    a longitudinal member having a length from top to bottom greater than the height of the opening through said component plus the thickness of the mounting surface; and
    a bottom portion;
    the longitudinal member connecting the top and bottom portions, said bottom portion having a major axis substantially perpendicular to the longitudinal member, and having a portion with an inclined upper surface extending partially around the longitudinal member, a distance, X, from the point of engagement of the top portion with the component when the component is secured by said fastener to said mounting surface being less than the height of the opening through said component plus the thickness of the mounting surface; so that the major axis of the bottom portion of said fastener is aligned with the elongated opening in the mounting surface respectively; and
    rotating said fastener to mechanically fasten the component to the mounting surface with a mounting force which varies continuously with rotation of said fastener, said degree of rotation being dependent upon the mounting force desired.

8. The method of claim 7 further comprising the step of aligning a plurality of rotation preventing key portions of the component with a corresponding plurality of key openings in the mounting surface.

9. The method of claim 7 further comprising the step of using a predetermined torque to rotate said fastener so that the mechanical fastening force is carefully regulated regardless of tolerances in the height of the component to be mounted or the thickness of the mounting surface.

10. A fastener as in claim 1, wherein said longitudinal member has a diameter which is always less than the diameter of said opening in said component and said mounting surface, such that said fastener's rotation is not obstructed by said longitudinal member.

11. A fastener as in claim 1, wherein said component is bulky and said mounting surface is a printed circuit board.

12. A fastener as in claim 1, wherein said component is a connector and said mounting surface is a printed circuit board.

13. A fastener as in claim 1, wherein said fastener is a single piece.

14. The method of claim 7, further comprising the step of soldering said component to said mounting surface.

15. The method of claim 7, wherein said component is bulky and said mounting surface is a printed circuit board.

16. The method of claim 15, further comprising the step of soldering said bulky component to said printed circuit board.

17. The method of claim 7, wherein said component is a connector and said mounting surface is a printed circuit board.

18. The method of claim 17 further comprising the step of soldering said connector to said printed circuit board.

19. The method of claim 7, wherein the top portion of the inclined surface is serrated.

20. A fastener as in claim 1 wherein said point of engagement of the top portion with the component when the component is secured by said fastener to said mounting surface, is at the top of the longitudinal member.

* * * * *

UNITED STATES PATENT AND TRADEMARK OFFICE
CERTIFICATE OF CORRECTION

PATENT NO. : 4,827,609
DATED : May 9, 1989
INVENTOR(S) : Kawecki

It is certified that error appears in the above—identified patent and that said Letters Patent is hereby corrected as shown below:

In the Specification:

Column 2, line 22 delete "a" and insert --as--.

In the Claims:

Claim 1, column 5, line 21 delete "hold" and insert --hole--.

Signed and Sealed this

Twenty-seventh Day of November, 1990

Attest:

HARRY F. MANBECK, JR.

*Attesting Officer*   *Commissioner of Patents and Trademarks*